(12) United States Patent
Schilo

(10) Patent No.: US 9,150,747 B2
(45) Date of Patent: Oct. 6, 2015

(54) SELF DESIGNED FASHION WEAR AND OTHER ARTICLES

(75) Inventor: Ran Schilo, Har-Adar (IL)

(73) Assignee: MY DESIGN LIMITED, Hong Kong (HK)

( * ) Notice: Subject to any disclaimer, the term of this patent is extended or adjusted under 35 U.S.C. 154(b) by 870 days.

(21) Appl. No.: 12/446,356

(22) PCT Filed: Oct. 25, 2007

(86) PCT No.: PCT/IL2007/001292
§ 371 (c)(1),
(2), (4) Date: Apr. 20, 2009

(87) PCT Pub. No.: WO2008/050338
PCT Pub. Date: May 2, 2008

(65) Prior Publication Data
US 2010/0320102 A1    Dec. 23, 2010

Related U.S. Application Data

(60) Provisional application No. 60/862,775, filed on Oct. 25, 2006, provisional application No. 60/864,402, filed on Nov. 5, 2006.

(51) Int. Cl.
*C09D 5/20* (2006.01)
*C09D 7/00* (2006.01)
(Continued)

(52) U.S. Cl.
CPC ............ *C09D 133/02* (2013.01); *A43B 1/0027* (2013.01); *A43B 3/00* (2013.01); *A43B 3/0078* (2013.01); *A43D 8/16* (2013.01); *A43D 999/00* (2013.01); *C09D 5/008* (2013.01); *C09D 9/005* (2013.01); *A43B 1/02* (2013.01); *A43B 1/10* (2013.01); *A43B 1/14* (2013.01); *A43B 23/24* (2013.01); *B65B 33/00* (2013.01);
(Continued)

(58) Field of Classification Search
None
See application file for complete search history.

(56) References Cited

U.S. PATENT DOCUMENTS 3,862,847 A * 1/1975 Newberger .................. 427/271
4,247,339 A * 1/1981 Bolton et al. ................ 106/468
(Continued)

FOREIGN PATENT DOCUMENTS

WO     WO 98/10026 A     3/1998
WO     WO 03/079832 A    10/2003

OTHER PUBLICATIONS

Appendix A is the (cancelled) MIL-P-52905—one page, Nov. 9, 1988.
(Continued)

*Primary Examiner* — Vivian Chen
(74) *Attorney, Agent, or Firm* — Pearl Cohen Zedek Latzer Baratz LLP

(57) ABSTRACT

Erasable paintings used to paint a design on the at least one paintable surface of the footwear. The erasable paintings are insoluble in water and thus can withstand any weather conditions. The present invention also provides an erasing solution for completely erasing the erasable from the paintable surface. The present invention also provides an article of footwear having at least one paintable surface and at least one erasable painting. The article of footwear may also include an erasing solvent to erase the at least one erasable painting. The article of footwear may also include a spray and/or liquid to make the painting permanent and/or a painting instrument. The article of footwear may also include various accessories.

12 Claims, 8 Drawing Sheets

(51) Int. Cl.

| | |
|---|---|
| *C09D 7/12* | (2006.01) |
| *C09D 9/00* | (2006.01) |
| *C09D 133/02* | (2006.01) |
| *C09D 133/04* | (2006.01) |
| *C08K 5/17* | (2006.01) |
| *C08K 5/205* | (2006.01) |
| *C08K 5/315* | (2006.01) |
| *C08K 5/3415* | (2006.01) |
| *C08K 5/3447* | (2006.01) |
| *C08K 5/46* | (2006.01) |
| *C08K 5/47* | (2006.01) |
| *A43B 1/02* | (2006.01) |
| *A43B 1/10* | (2006.01) |
| *A43B 1/14* | (2006.01) |
| *A43B 23/24* | (2006.01) |
| *B65B 33/00* | (2006.01) |
| *A43B 1/00* | (2006.01) |
| *A43B 3/00* | (2006.01) |
| *A43D 8/16* | (2006.01) |
| *A43D 999/00* | (2006.01) |
| *C09D 5/00* | (2006.01) |
| *C08K 5/00* | (2006.01) |

(52) U.S. Cl.
CPC ............... *C08K 5/0058* (2013.01); *C08K 5/17* (2013.01); *C08K 5/205* (2013.01); *C08K 5/315* (2013.01); *C08K 5/3415* (2013.01); *C08K 5/46* (2013.01); *C08K 5/47* (2013.01); *C09D 5/20* (2013.01); *C09D 7/00* (2013.01); *C09D 7/001* (2013.01); *C09D 7/12* (2013.01); *C09D 7/1208* (2013.01); *C09D 7/1233* (2013.01); *C09D 9/00* (2013.01); *C09D 133/04* (2013.01)

(56) References Cited

U.S. PATENT DOCUMENTS

| | | | | | |
|---|---|---|---|---|---|
| 4,526,913 | A | * | 7/1985 | Winkler et al. | 524/31 |
| 4,627,110 | A | * | 12/1986 | Tengs | 2/69 |
| 4,830,690 | A | * | 5/1989 | Cooper | 156/63 |
| 4,858,357 | A | * | 8/1989 | Thorn | 40/450 |
| 5,041,488 | A | * | 8/1991 | Meades | 524/380 |
| 5,077,086 | A | * | 12/1991 | Cavill | 427/142 |
| 5,165,337 | A | * | 11/1992 | Schlundt | 101/114 |
| 5,308,390 | A | * | 5/1994 | Pennaz | 524/313 |
| 5,310,579 | A | * | 5/1994 | Fornataro | 427/290 |
| 5,371,326 | A | * | 12/1994 | Clearwaters-Dreager et al. | 174/128.1 |
| 5,409,760 | A | * | 4/1995 | Neitz et al. | 428/195.1 |
| 5,467,893 | A | * | 11/1995 | Landis et al. | 221/34 |
| 5,514,415 | A | * | 5/1996 | Gupta | 427/271 |
| 5,604,282 | A | * | 2/1997 | Grogan et al. | 524/232 |
| 5,773,091 | A | * | 6/1998 | Perlman et al. | 427/384 |
| 5,839,211 | A | * | 11/1998 | Pallera | 36/136 |
| 5,902,111 | A | * | 5/1999 | Lindsey | 434/81 |
| 6,096,699 | A | * | 8/2000 | Bergemann et al. | 510/201 |
| 6,174,938 | B1 | * | 1/2001 | Miller et al. | 523/164 |
| 6,284,826 | B1 | * | 9/2001 | Kinoshita et al. | 524/376 |
| 6,420,474 | B1 | * | 7/2002 | Carey et al. | 524/501 |
| 6,421,832 | B1 | * | 7/2002 | Ondrejko et al. | 2/69 |
| 6,464,823 | B1 | * | 10/2002 | Vantyle | 156/701 |
| 6,616,975 | B1 | * | 9/2003 | Reizian | 427/271 |
| 6,632,499 | B1 | * | 10/2003 | Marks et al. | 428/42.1 |
| 6,645,554 | B1 | * | 11/2003 | LePage | 427/154 |
| 6,713,522 | B2 | * | 3/2004 | Zhang et al. | 521/170 |
| 6,822,012 | B1 | * | 11/2004 | Baumgart et al. | 521/170 |
| 6,964,989 | B1 | * | 11/2005 | Fang et al. | 524/145 |
| 7,473,758 | B2 | * | 1/2009 | Bohnert et al. | 528/480 |
| 7,531,032 | B2 | * | 5/2009 | Cordova | 106/31.25 |
| 7,556,841 | B2 | * | 7/2009 | Kimball et al. | 427/292 |
| 7,661,208 | B2 | * | 2/2010 | McKinney et al. | 36/136 |
| 7,776,788 | B2 | * | 8/2010 | Tetrault | 503/201 |
| 7,878,968 | B2 | | 2/2011 | Wittmann-Price et al. | |
| 8,037,545 | B2 | * | 10/2011 | McLaughlin | 2/69 |
| 8,117,768 | B2 | | 2/2012 | Bobbett | |
| 2001/0047951 | A1 | * | 12/2001 | O'Connor | 206/575 |
| 2002/0172809 | A1 | * | 11/2002 | Tetrault | 428/195 |
| 2004/0081844 | A1 | * | 4/2004 | Bharti et al. | 428/523 |
| 2004/0148830 | A1 | * | 8/2004 | Baskerville | 40/600 |
| 2005/0027024 | A1 | * | 2/2005 | Zhang et al. | 521/50 |
| 2006/0154031 | A1 | * | 7/2006 | Tomlinson | 428/195.1 |
| 2006/0251775 | A1 | * | 11/2006 | Anderson et al. | 426/383 |
| 2006/0251843 | A1 | * | 11/2006 | Givens et al. | 428/40.1 |
| 2006/0276356 | A1 | * | 12/2006 | Panandiker et al. | 510/100 |
| 2007/0287766 | A1 | * | 12/2007 | Kuczynski et al. | 523/124 |
| 2009/0091166 | A1 | | 4/2009 | Jha | |

OTHER PUBLICATIONS

Appendix B is from www.TPub, Chapter 4 Camouflaging Procedure:—two pages, printed from internet on Mar. 29, 2012.

* cited by examiner

SELF DESIGNED FASHION WEAR AND OTHER ARTICLES

REFERENCE TO CO-PENDING APPLICATIONS

Priority is claimed from a 371 of international of PCT/IL2007/001292, filed on Oct. 25, 2007; which claims priority from U.S. provisional patent application Ser. Nos. (a) 60/862,775, filed on Oct. 25, 2006 and (b) 60/864,402, filed on Nov. 5, 2006.

FIELD OF THE INVENTION

The present invention relates to an article of footwear, and more particularly to an article of footwear including footwear with at least one paintable surface and erasable paintings. The erasable paintings are used to paint a design on the paintable surface of the footwear. The erasable paintings are insoluble in water and thus can withstand substantially any weather conditions. The paintings are sustainable under normal use of the article also non-crackable and flexible to fit flexible surfaces and prevent breaking, cracking, chipping or peeling of the painting, when bending. The article of footwear may also include a paint erasing solvent, a spray and/or liquid to make the paint permanent and/or an instrument for painting, e.g. paintbrush.

BACKGROUND OF THE INVENTION AND PRIOR ART

Often as children, we enjoyed sketching and painting a design on our own shoes. Furthermore, a person would have enjoyed designing, sketching, and/or painting his own footwear, with an option of redesigning the recent design by erasing the recent design and painting a new design.

But footwear such as boots, shoes, sandals, flip-flops etc. are not designed to be sketched, coated or written on. If a user does paint on a footwear item it will be either not erasable from the footwear or not sustainable on the footwear.

There is therefore a need for and it would be highly advantageous to have footwear such as boots, shoes, sandals, flip-flops, crocs look alike shoes etc., and other articles such as belts, bags, umbrellas, handbags, purses, lunchboxes, furniture, hair-bows, coats, shirts, pants, other fashion wear and fashion accessories, leather articles, plastic or polymeric articles, etc., on which a person can sketch, paint and/or write. The articles will be provided with erasable paints and erasing solvent as a single article of manufacture. The person can than use the paints supplied to paint on the footwear a design the person desires. The person can also erase the design using a supplied erasing solvent and paint a new design.

The term "permanent marker" as used herein refers to a commonly used marker which is not erasable from a commonly used white board by a dry eraser or water.

SUMMARY OF THE INVENTION

According to the teachings of the present invention there is provided a method of manufacturing an article such as footwear, the article having a surface, the method including the steps of:
  (a) coating at least a portion of the article surface with oil, thereby producing a coated surface; and
  (b) heating the article to a temperature suitable to the material from which the article is made of, for a predetermined heating time, thereby producing the paintable surface, whereas the paintable surface provides an erasable surface that can be painted on.

In embodiments of the present invention, the coating oil includes:
  a) polybutadiene rubber;
  b) gasoline number 190; and
  c) sulfur.

If the article is made of materials including rubber, the oven temperature is set to 130° C.±15° C. and the article is left in the oven for 60 minutes±15 minutes. The article manufactured according to methods of the present invention may include articles selected from the group of articles including footwear, belts, handbags, purses, lunchboxes, furniture, crocs-look-alike shoes, hair-bows, coats, shirts, pants, other fashion wear and fashion accessories, leather articles, plastic or polymeric articles and other articles the like.

According to the teachings of the present invention there are further provided methods to manufacture colored paintings that can be coated on the paintable surface, the painting being insoluble in water or salt water, but erasable by solvents provided by the present invention. The painting of the present invention is at least as flexible as said paintable surface, sustainable under normal use of the article, resistant to breaking, cracking, peeling and chipping. The present invention provides several example painting mixtures that are capable to provide characteristics described.

According to the teachings of the present invention there are provided kits including articles such as footwear, and one or more erasable paints according to embodiments of the present invention. The kits may further include an erasing solvent that when applied to a painted paintable surface, the erasable paint of the present invention is removed from the paintable surface and the paintable surface can then be recoated with an erasable paint of the present invention.

The kits may further include a powder or solvent that when applied onto a painted paintable surface, the powder/solvent makes the painted paintable surface permanent and non-erasable, including not by the erasing solvent of the present invention.

The kits may further include a painting instrument for applying the erasable paint onto the paintable surface, the painting instrument selected from the group of instruments including of a painting brush, a marker, a painting fabric, a painting sponge, pen and/or pencil.

The kits may further include an accessory selected from the group of accessories consisting of a sticker, a sticker that can be painted on by the erasable paints of the present invention, a removable sticking stencil having figures and shapes cut off them (such that when painted in side and the stencil is removed, the cut off shape or figure remains painted on the article), items that can be glued on the footwear item, the items selected from the group of items including beads, buttons, dots, powder/sand, zippers, shoelace, fur or fur alike, pompons, belt, eyes, moustache, ears and so on, pieces of fabric, internal and external linings, color glue or attached by a tic-tac or any other attachments know in the art, or any other accessory. All stickers are weather proof and sustainable to normal abuse such as when walking. All stickers can be peeled with or without hot water.

Footwear or other article, according to embodiments of the present invention, having paintable surface, may further include a design which can be colored with paints of the present invention. The painting remains on the design unless removed by an erasable solvent, according to embodiments of the present invention, and can then be recoated with paints of the present invention. The design can be permanent or erasable.

Footwear or other articles, according to embodiments of the present invention, can be made of material selected from the group of materials including rubber, plastic, leather, fabric, foam, polymers, PVC, EVA, PU, Croslite, sky, nylon or any kind of polymer coated textile or natural opaque materials or any other material used in the art.

The term "paintable article" as used herein refers to articles being part of an article kit, according to embodiments of the present invention.

The term "erasable paintable" as used herein refers to paintings that when applied to a surface can be substantially removed from the surface by erasing solvent.

The term "paintable surface" as used herein refers to a surface of an article which can be painted on by an erasable painting, according to embodiments of the present invention.

The term "permanent" as used herein refers to a painting or a design being non erasable, resistant to common solvents, including the erasing solvent.

BRIEF DESCRIPTION OF THE DRAWINGS

The present invention will become fully understood from the detailed description given herein below and the accompanying drawings, which are given by way of illustration and example only and thus not limitative of the present invention, and wherein.

DESCRIPTION OF THE PREFERRED EMBODIMENTS

Figure 1:
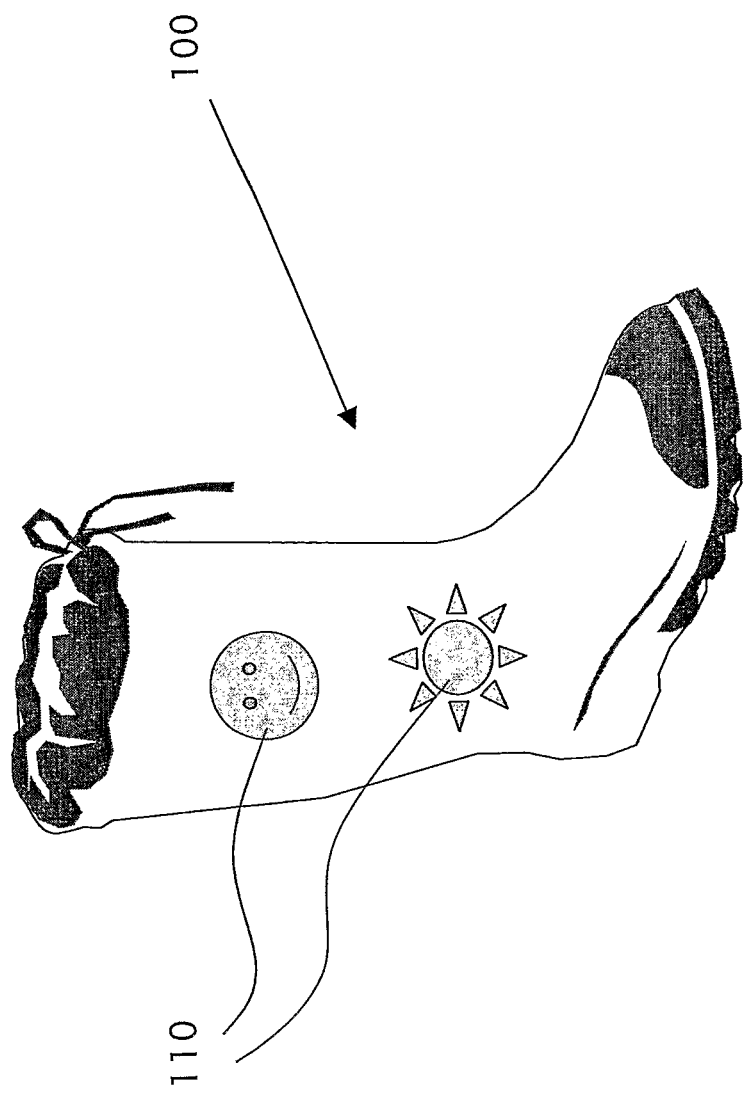
FIG. 1 illustrates an example of painting on paintable footwear, manufactured in accordance with embodiments of the present invention, having a sketched design.

The present invention is an article of footwear having at least one paintable surface, which is manufactured according to embodiments of the present invention, and at least one erasable painting. The erasable painting is used to paint a design on the at least one paintable surface of the footwear. The erasable paintings are insoluble in water and thus can withstand any weather conditions. The article of footwear may also include an erasing solvent to erase the at least one erasable painting. The article of footwear may also include a spray and/or liquid to make the painting permanent and/or a painting instrument.

Before explaining embodiments of the invention in detail, it is to be understood that the invention is not limited in its application to the details set forth in the description or illustrated in the drawings.

Unless otherwise defined, all technical and scientific terms used herein have the same meaning as commonly understood by one of ordinary skill in the art of the invention belongs. The methods and examples provided herein are illustrative only and not intended to be limiting.

By way of example, with no limitation upon other articles, the present invention is described through a footwear article, but the description of the present invention is applicable to many other articles such as beads, buttons, dots, powder/sand, zippers, shoelace, fur or fur alike, pompons, belt, eyes, moustache, ears and so on, pieces of fabric, internal and external linings, color glue or attached by a tic-tac or any other attachments know in the art, or any other accessory. All stickers are weather proof and sustainable to normal abuse such as when walking. All stickers can be peeled with or without hot water.

It should be noted that footwear or other articles, according to embodiments of the present invention, can be made of material selected from the group of materials including rubber, plastic, leather, fabric, foam, polymers, PVC, EVA, PU, Croslite, sky, nylon or any kind of polymer coated textile or natural opaque materials or any other material used in the art.

FIG. 1 illustrates an example of a painting on paintable footwear 100, preferably manufactured in accordance with embodiments of the present invention, and with a sketched design 110.

Paintable footwear 100 or other articles having a surface to be painted on made of materials containing rubber, is preferably manufactured according with a method of manufacturing, the method including the following steps:

a. paintable footwear 100 is coated with an oil mixture;
b. the coated paintable footwear 100 is put into an oven, heated to a temperature T for a certain period of time t, where temperature T and time t depend on the material paintable footwear 100 is made of; and
c. paintable footwear 100 is cooled off to ambient temperature.

For example: for a paintable footwear 100 that is made of rubber, is coated with an oil mixture and place in an oven heated to a temperature T=130° C.±15° C., for time duration of t=60 minutes±15 minutes.

The oil mixture includes, for example the following ingredients:

a) CIS-1.4 polybutadiene rubber;
b) gasoline number 190; and
c) sulfur.

Typically, to coat paintable footwear 100 with the oil mixture, footwear 100 is dipped into a barrel that contains the oil mixture and is hanged until the gasoline evaporates. Footwear 100 is then put into the oven and when taken out, footwear 100 is left to cool down. Before painting, for best results, the footwear 100 is preferably washed with water and soap, rinsed dried.

The process provides a paintable surface for article 100 and leaves no marks or stains on article 100, nor does the process damage article 100 in any other way.

Preferably, paintable footwear 100 is made of natural rubber (caoutchouc) and/or synthetic rubber or contains rubber, but paintable footwear 100 can also be made of plastic, foam, PVC, EVA, PU, Croslite and/or other polymers and on which painting can be applied. Paintable footwear 100 can be made of about 50% caoutchouc, calcium carbonate, sulfur, zinc oxide and stearic acid. This was given be way of example only, with no limitation, and footwear 100 can be made of materials containing other percentages of caoutchouc or other ingredients.

For the sake of clarity, footwear 100 can be manufactured in any color or in multiple colors, whereas the color applied to a surface at manufacturing time, remains permanently on the surface.

Figure 2:
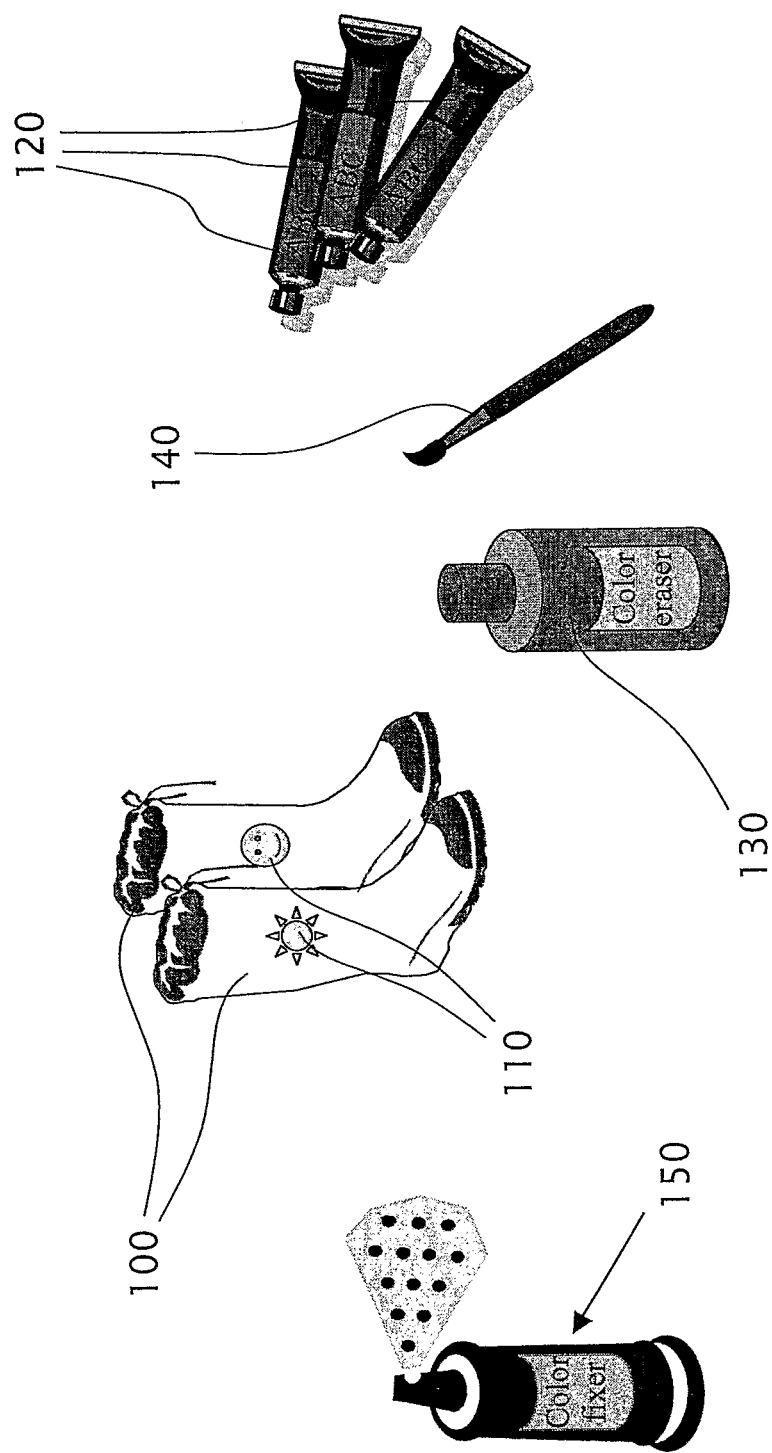
FIG. 2 illustrates an example article of manufacture, in accordance with embodiments of the present invention, including a footwear item, paints, erasable solvent and painting brush.

FIG. 2 illustrates an example article of manufacture, in accordance with embodiments of the present invention, including a footwear item 100, erasable paints 120, erasing solvent 130 and painting brush 140. Erasable paints 120 are provided for painting a design 110 on the paintable surface of footwear item 100. Erasable paints 120 do not erase by water (rain and the like), water containing salt, but will erase when applying erasing solvent 130, which is optionally provided by an article of manufacture, according with embodiments of the present invention.

Erasable paints 120 can be any suitable type of paint made of a mixture depending on the pigment used and on the material erasable paints 120 are applied to. Erasable paints 120 are non erasable by water or salt water and thus withstand substantially any weather conditions. Erasable paints 120 are sustainable under normal use of the article, non-crackable and flexible to fit flexible surfaces and prevent breaking, cracking, chipping or peeling of the painting, when bending. Thus, when painted on boots, for example, paints 120 withstand any bending of a boot surface and reasonable rubbing forces applied to a painted boot surface.

Examples of erasable paints 120, according to embodiments of the present invention, are given herein by way of example only:

Example 1

|    | Ingredient | Quantity (may very) | CAS # |
|----|------------|---------------------|-------|
| a) | Ethylene Glycol (Glycol) | 5-38% | 107-21-1 |
| b) | Barium sulfate (BaSO4) | 2-28% | 7727-43-7 |
| c) | Carbendazim (BCM) | 0.05-1% | 10605-21-7 |
| d) | Chlorothalonil | 0.08%-1% | 1897-45-6 |
| e) | Polyacrylic acid (Acrylic Resin) | 35%-85% | 9003-1-4 |
| f) | Triethanolamine | 0.7%-2.5% | 102-71-6 |
| g) | Lithopone (optional) | 2%-22% | 1345-05-7 |
| h) | Penetrating agent JFC (optional) [RO(CH2CH2O)nH] | 0.2%-1.5% | |
| i) | Colorant | 2%-45% | |
| i. | Titanium white (Tio2) | | 13463-67-7 |
| ii. | Black (C) | | 1333-86-4 |
| iii. | Red (2R) | | 6410-26-0 |
| iv. | Yellow (G) (orange pigment) or Yellow 10G | | 3520-72-7 |
| v. | Green | | |
| 1. | Yellow 10G | | 6486-23-3 |
| 2. | Phthalocyanine Green (G) | | 1328-53-6 |
| 3. | Phthalocyanine Blue (BGS) | | 147-14-8 |
| 4. | Tio2 | | 13463-67-7 |
| vi. | Blue | | |
| 1. | Phthalocyanine Blue (BGS) | | 147-14-8 |
| 2. | Phthalocyanine Green (G) | | 1328-53-6 |

The colorant type and quantities are given by way of example only. Blue, for example, can be Pigment Blue 29 (CAS-57455-37-5), Green may exclude the blue portion and so on. Other colors can be obtained by mixing certain colors, for example, a pink color can be obtained by mixing white and red.

Some ingredient are added or removed for a particular color. For example, BaSO4 is removed for a black color, lithopone is add to white and yellow colors, penetrating agent JFC is added to black, yellow red and green, and ethylene glycol can be substituted with propylene glycol.

Some ingredient can be substituted by another ingredient, for example acrylic resin can be substituted by butyl acrylate.

Example 2

|    | Ingredient | Quantity (may very) | CAS # |
|----|------------|---------------------|-------|
| a) | Polyacrylic acid (Acrylic Resin) | 54%-95% | 9003-1-4 |
| b) | Propylene glycol benzene ether | 1.5%-18% | 67-63-0 |
| c) | Disperser | 0.1-3% | 84133-50-6 |
| d) | preservative | 0.05-3% | 55965-84-9 |
| e) | Colorant | 2%-22% | |
| i. | Titanium white (Tio2) | | 13463-67-7 |
| ii. | Black (C) | | 1333-86-4 |
| iii. | Red (2R) | | 16423-68-0 |
| iv. | Yellow (G) | | 1934-21-0 |
| v. | Green | | 1328-53-6 |
| vi. | Blue | | 3844-45-9 |
| vii. | pink | | 81-88-9 |

To enable easy peel-off of the painting, (for example, for footwear 100 made of Croslite) using a sharp object such as a finger nail, the following erasable painting 120, according to embodiments of the present invention, can be use:

Example 3

|    | Ingredient | Quantity (may very) |
|----|------------|---------------------|
| a) | Acrylic resin designed to promote peel-off | 60%-94% |
| b) | Acrylic resin designed to promote adhesion | 0% |
| c) | Anti-settling agent (montmorillonite clay) | 0.01%-3% |
| d) | Thickener (cellulosic) | 0.02%-3.2% |
| e) | Water | 2%-16% |
| f) | colorant | 2%-19% |

It should be noted that the paining of example 3 has all other characteristics of the erasable paints of the present invention.

To prevent easy peel-off of the painting, even when using sharp objects such as a finger nail, the following erasable painting 120, according to embodiments of the present invention, can be use:

Example 4

|    | Ingredient | Quantity (may very) |
|----|------------|---------------------|
| a) | Acrylic resin designed to promote peel-off | 23%-73% |
| b) | Acrylic resin designed to promote adhesion | 15%-47% |
| c) | Anti-settling agent (montmorillonite clay) | 0.1%-3% |
| d) | Thickener (cellulosic) | 0.1%-2.5% |
| e) | Water | 3%-21% |
| f) | colorant | 2.5%-11% |

In other embodiments of the present invention, the following erasable acrylic painting 100 can be use:

Example 5

| | Ingredient | Quantity (may very) | CAS # |
|---|---|---|---|
| a) | Acrylic Resin | 52%-96.5% | 9003-1-4 |
| b) | Glycol | 2.5%-12% | 107-21-1 |
| c) | Triethanolamine | 0.5%-4% | 102-71-6 |
| d) | BCM | 0.1%-2.5% | 10605-21-7 |
| e) | 2-Methyl-4-Isothiazolin-3-one ($C_4H_5NOS$) | 0.1%-2.7% | 2682-20-4 |
| f) | Texanol (C12H24O3) | 0.1%-3% | 25265-77-4 |
| g) | A mixture of oils, such as S-3016 from the Shanghai Chang Feng company | 0.05%-2% | |
| h) | Colorant | 2%-27% | |
| a) | Titanium white (Tio2) | | 13463-67-7 |
| b) | Black (C) | | 1333-86-4 |
| c) | Red (FBB) | | 52-68-2 |
| d) | Yellow (2G) | | 4531-49-1 |
| e) | Green | | 1328-53-6 |
| f) | Blue | | 147-14-8 |

It should be noted, that in this example (5), the acrylic resin can be substituted by butyl acrylate and glycol can be substituted by propylene glycol.

It should be noted that, for all example, the quantity of the ingredients may vary by ±40%, depending on the desired flexibility, desired adhesiveness, desired shade of the color, desired clarity of the color, the surface becoming glary or mat, the climate conditions, etc.

Erasing solvent 130 can be alcohol based, acetone based or/and other solvents the like known in the art. It should be noted that since erasing solvent 130 is typically supplied to be used by children, erasing solvent 130 should be safe for usage by children. Erasing solvent 130 may be supplied with pads to apply solvent 130 to a painted footwear item 100.

Examples of erasing solvent 130, according to embodiments of the present invention, are given herein by way of example only:

Example 1 a) ethyl lactate (30-80%);
b) water or neutral ph materials (10-70%);
c) glycerin (optional) (5-25%);
d) preservative (optional)
e) bittering agent (optional)
f) Fragrance (optional).
g) Ethanol (optional)

Example 2 a) methyl soyate (40-95%); and
b) ethanol (5-60%).
c) Preservative (optional);
d) bittering agent (optional); and
e) Fragrance (optional).

The solutions can be diluted with any neutral ph ingredient and glycerin can be added or any kind of moisturizing agent.

It should be noted that, for all example, the quantity of the ingredients may vary by ±40%.

It should be noted that, the wide range is needed to adapt to the material from which an article is made and to be suitable for use of children.

FIGS. 3-12 illustrate various examples of paintings on paintable footwear 100, manufactured in accordance with embodiments of the present invention, and with a painted design 110.

There are a number of optional kits that can be supplied with the footwear article of manufacture:

Option 1:

Footwear 100 will be provided with erasable paints 120 and/or erasable markers, and erasing solvent 130. A person can then use the erasable paints 120 supplied to paint or draw on footwear 100 a design 110 and keep design 110 as long that the person wants. The person can also erase design 110 and than paint a new design 110. This can be repeated to the person's liking. Optionally, erasing solvent 130 will be supplied separately.

Option 2:

Footwear 100 will be provided with erasable paints 120, paint brush 140 and erasing solvent 130. A person can then apply erasable paints 120 supplied to paint with the paint brush 140 on footwear 100 a design 110 and keep design 110 as long that the person wants. The person can also erase design 110 and than paint a new design 110. This can be repeated to the person's liking. Optionally, erasing solvent 130 will be supplied separately.

Option 3:

Footwear 100 will be provided with erasable paints 120 or markers. A person can then use erasable paints 120 supplied to paint or draw on footwear 100 a design 110. Once the person is satisfied with the design 110, the person sprays design 110 on footwear 100 with spray 150 that makes design 110 permanent. Spray 150 will be supplied with the footwear article of manufacture or obtained separately. Spray 150 is given by way of example and design 110 can be coated in any other way with a liquid or powder to make design 110 permanent.

In another embodiment, instead of spray 150, a liquid, powder or any other proper material in any form will be used to make the design permanent.

Figure 3:
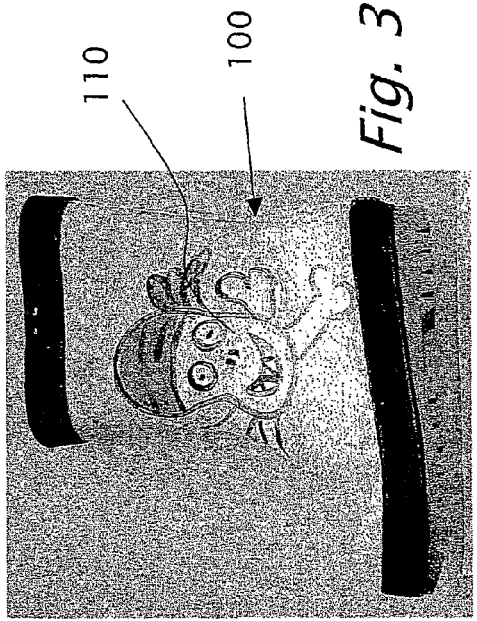
FIGS. 3-12 illustrate various examples of paintings on paintable footwear, manufactured in accordance with embodiments of the present invention, and having a painted design.
Figure 5:
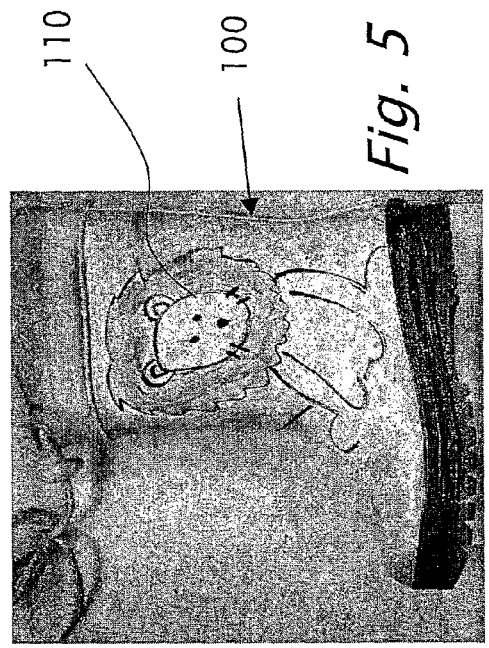
Figure 4:
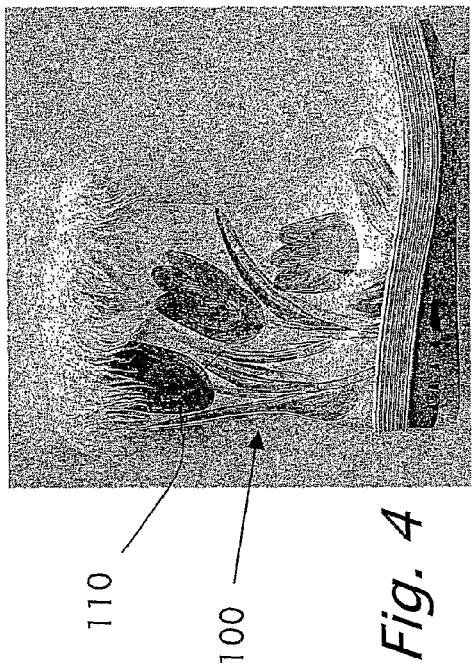
Figure 6:
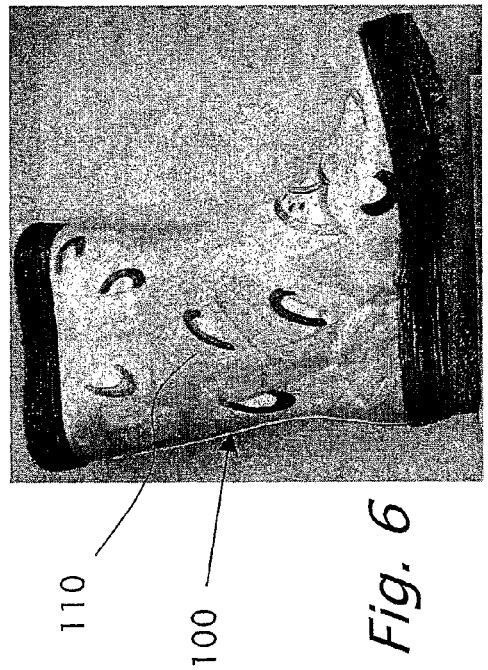
Figure 7:
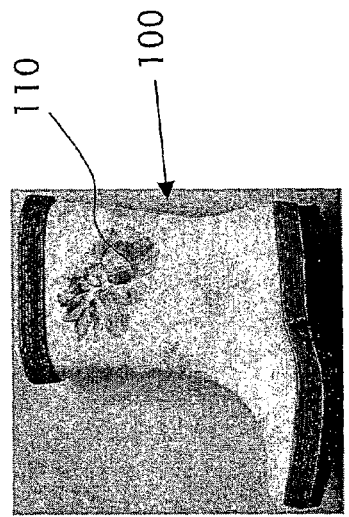
Figure 8:
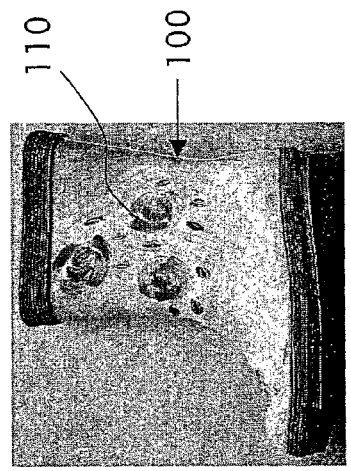
Figure 9:
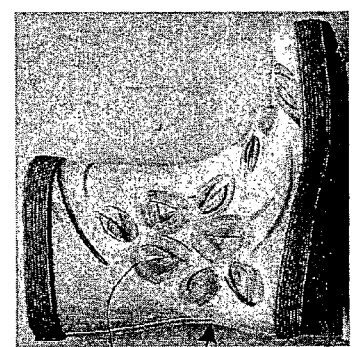
Figure 10:
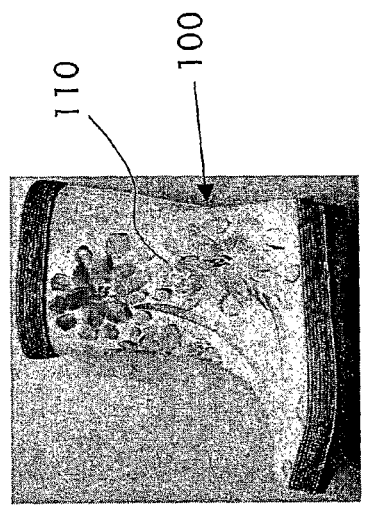
Figure 11:
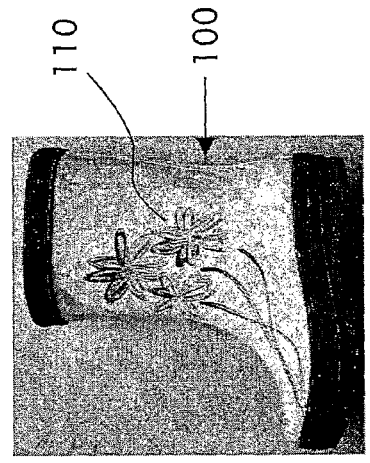
Figure 12:
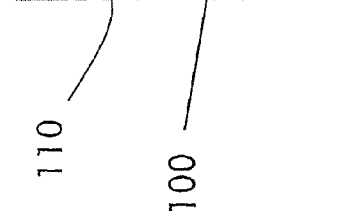

Option 4:

Footwear 100 will be provided with a design 110 permanently drawn on footwear 100 and with erasable paints 120 and optionally with erasing solvent 130. The design 110 can then be painted by the person with erasable paints 120 supplied, to his liking. For example: the shoe will have a design 110 of a teddy bear, smile flower, pooh the bear and so on so forth. A person just needs to fill it in, just like is done in drawing books for kids. Example designs 110 are shown in FIGS. 1 and 3.

For the sake of clarity, the present invention is not limited to the above four kit options, and other kits can be supplied as well.

For the sake of clarity, the present invention has been described in terms of a footwear article of manufacture, but it is not limited to paintable footwear 100. Instead of a footwear item, the article of manufacture can also be applied to items such as belts, handbags, purses, lunchboxes, furniture, crocs-look-alike shoes, hair-bows, coats, shirts, pants, other fashion wear and fashion accessories, leather articles, plastic or polymeric articles and other products that are made of natural materials, fabric and textile materials.

Figure 13:
FIG. 13 illustrates an example of a page of removable sticking stencil including figures, to facilitate in painting a selected design.
Figure 14:
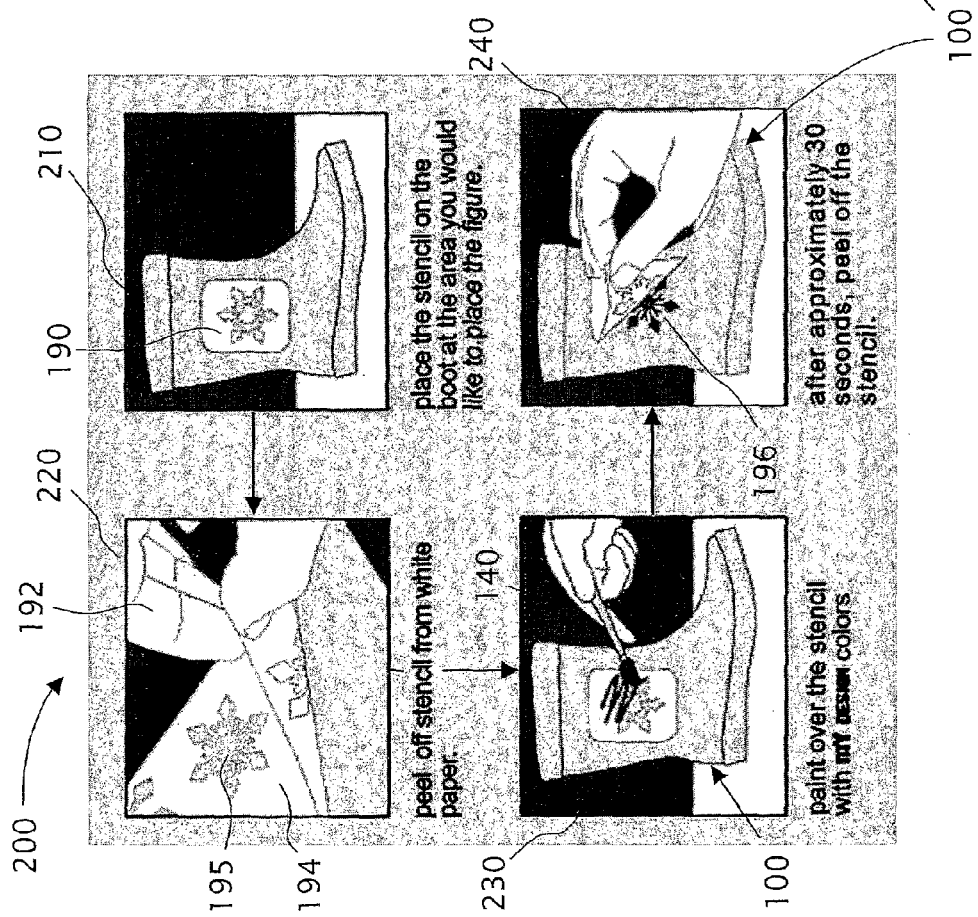
FIG. 14 illustrates an example method, for using the removable sticking stencil shown in FIG. 13.
Figure 15:
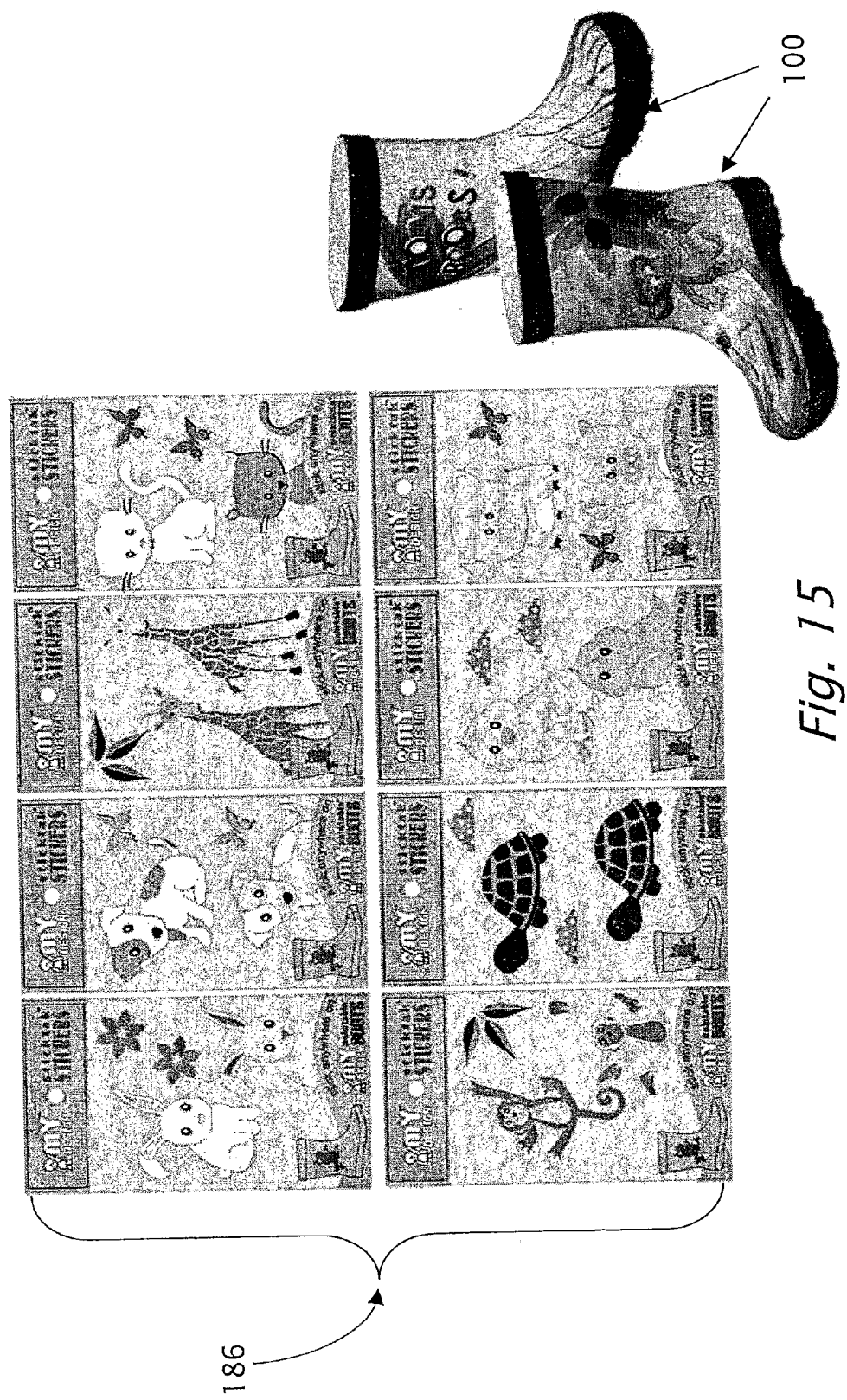
FIG. 15 illustrates an example of a page of stickers, to adorn the design.
Figure 16:
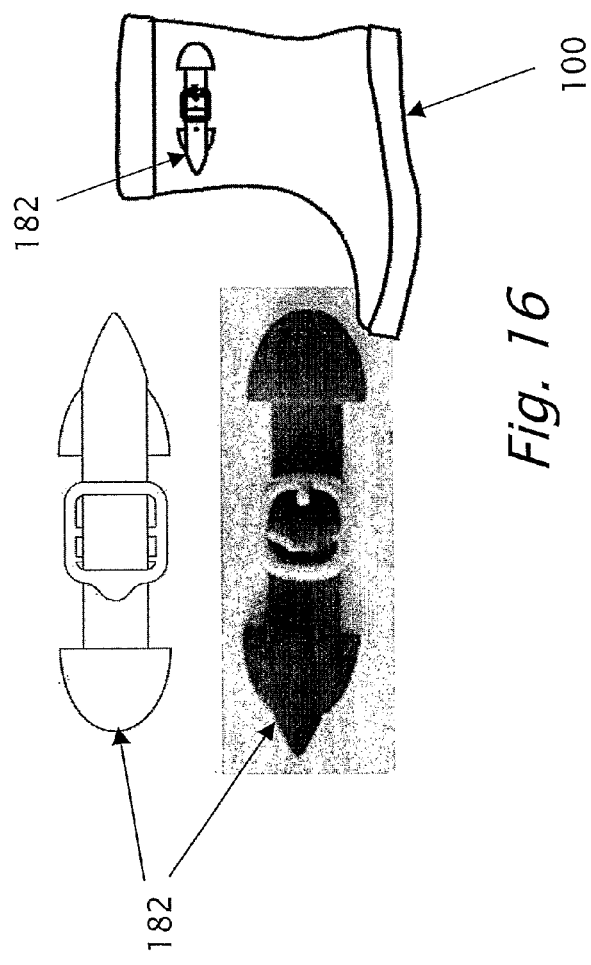
FIG. 16 illustrates an example article of manufacture, in according to embodiments of the present invention, including a sticking add-on belt accessory to adorn the design.
Figure 17:
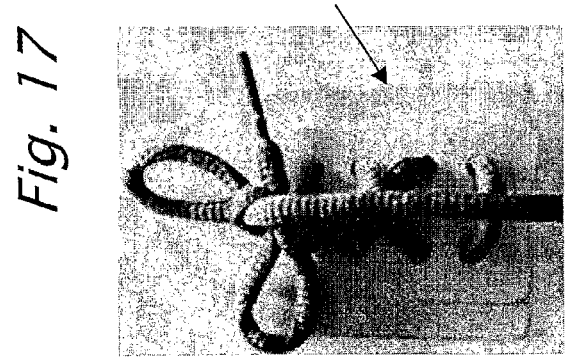
FIG. 17 illustrates an example article of manufacture, in according to embodiments of the present invention, including a sticking add-on shoelace accessory to adorn the design.
Figure 18:
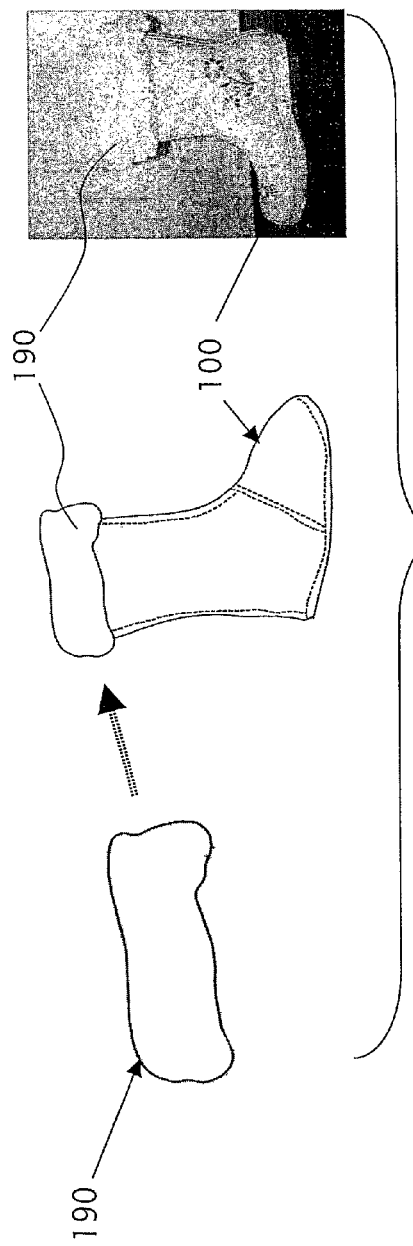
FIG. 18 illustrates an example article of manufacture, in according to embodiments of the present invention, having a painted design, including an add-on fur accessory to adorn the design.
Figure 19:
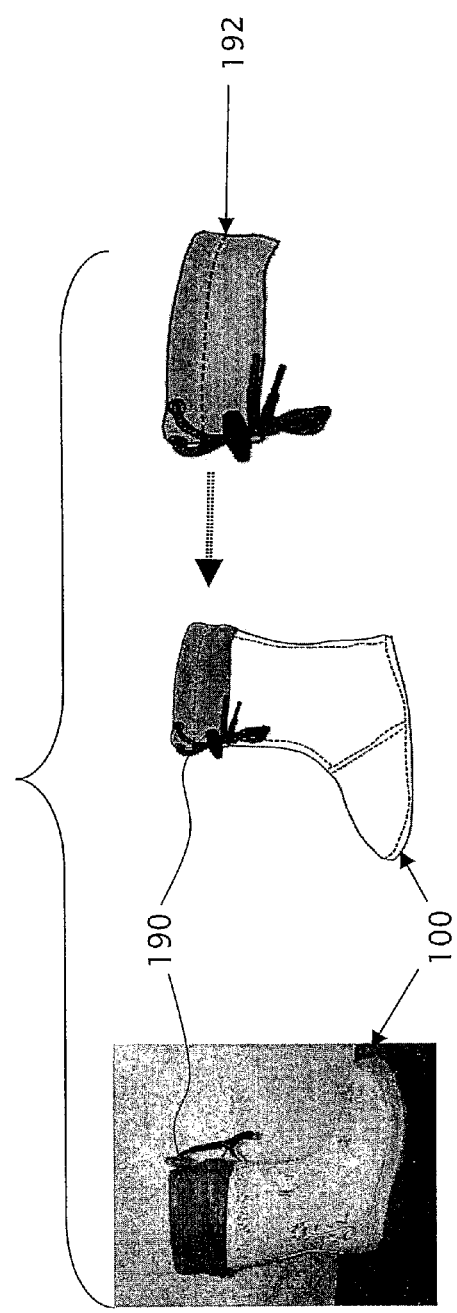
FIG. 19 illustrates an example article of manufacture, in according to embodiments of the present invention, having a painted design, including add-on a top accessory to adorn the design.

Kits may also include any of the following accessories:

a) a paint brush 140;
b) sticky or non sticky stencils that a person can attach to footwear 100 (or belt or handbag lunch boxes or furniture or any other article including articles with flexible a surface) use the stencils for the painting as needed and then reuse the stencil or discard it. FIG. 13 illustrates an example of a page 190 of removable sticking stencil including figures, to facilitate in painting a selected design. FIG. 14 illustrates an example method 200, for using the removable sticking stencil 190 shown in FIG. 13:
  i. place stencil 190 onto a selected location on a paintable surface of boot 100;
  ii. peel off stencil film 192 from paper 194, having a shaped cut-off area 195;
  iii. paint over cut off area 195 with erasable paints 120; and
  iv. after a short dry out time, paper 194 is peel off boot 100 and a painted shape 196 is left on boot 100.
  and
c) add-ons such as stickers, 3 dimensional (3D) stickers, plastic items or any kind of similar material to glue on (eyes, moustache, ears and so on, beads, buttons, dots powder sand, zippers, shoelace, fur or fur alike, pompons, belt, pieces of fabric, internal and external linings, color glue, etc.). All stickers are weather proof and sustainable to normal abuse such as when walking. All stickers can be peeled with or without hot water. FIG. 15 illustrates an example of a page of stickers 186, to adorn the design; FIG. 16 illustrates example footwear 100, in according to embodiments of the present invention, having a 3D sticking add-on belt accessory 182 to adorn the design. FIG. 17 illustrates example footwear 100, in according to embodiments of the present invention, having a 3D sticking add-on shoelace accessory 184 to adorn the design. FIG. 18 illustrates example footwear 100, in according to embodiments of the present invention, having a painted design, including an add-on fur accessory 190 to adorn the design. FIG. 19 illustrates example footwear 100, in according to embodiments of the present invention, having a painted design, including add-on a top accessory 192 to adorn the design;

Optionally, the kit can also include liquid or solvent that when coated on an article 100, then (after the liquid dries out) the user can paint on the dried surface his design 110. Alternatively, the kit can include a surface or sticker that attaches to an article 100, on which the user can paint his design 110.

In embodiments of the present invention erasable paints 120 are replaced by "permanent" markers, which are erasable by various erasable solutions 130 of the present invention.

In embodiments of the present invention, a substance that glows in the dark substance may be added to erasable paints 120.

The invention being thus described in terms of embodiments and examples, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A coloring kit for providing to a user footwear with a changeable design, comprising:
  a flexible footwear article;
  a removable paint, suitable to adhere as a coating to said flexible footwear article and to create or change a design on said flexible footwear article; and
  an erasing solvent suitable to completely remove said paint from the footwear article after said paint is dry;
  wherein said removable paint is water insoluble and is at least as flexible as said flexible footwear article when coated and dried on said flexible footwear article, and wherein said removable paint is a first paint composition comprising:
    a) 5%-38% of ethylene glycol;
    b) 0.05%-1% of carbendazim;
    c) 0.08%-1% of chlorothalonil;
    d) 35%-85% of acrylic resin;
    e) 0.7%-2.5% of triethanolamine; and
    f) 2%-45% of colorant;
  or said removable paint is a second paint composition comprising:
    a) 54%-95% of polyacrylic acid;
    b) 1.5%-18% of propylene glycol benzene ether;
    c) 0.1%-3% of disperser;
    d) 0.05%-3% of preservative; and
    e) 2%-22% of colorant;
  or said removable paint is a third paint composition comprising:
    a) 52%-96.5% of acrylic resin;
    b) 2.5%-12% of glycol;
    c) 0.5%-4% of triethanolamine;
    d) 0.1%-2.5% of carbendazim;
    e) 0.1%-2.7% of $C_4H_5NOS$;
    f) 0.1%-3% of 2,2,4-trimethyl-1,3-pentanediol monoisobutyrate;
    g) 0.05%-2% of an oil mixture; and
    h) 2%-27% of colorant;
  wherein said erasing solvent is safe for a child user.

2. The kit of claim 1, wherein said flexible footwear article is made of a material selected from the group consisting of rubber, plastic, leather, fabric, foam, polymers, PVC, EVA, PU, nylon, polymer-coated textile materials and natural materials.

3. The kit of claim 1, wherein the first paint composition further comprises one or more ingredients selected from $BaSO_4$, lithopone, and polyethylene glycol-based penetrating agent.

4. The kit of claim 1, wherein the paint is suitable to be peeled-off the surface of the footwear article.

5. The kit of claim 1, wherein the erasing solvent comprises:
  a) 30%-80% of ethyl lactate; and
  b) 10%-70% of water or a liquid with neutral pH.

6. The kit of claim 5, wherein the solvent further comprises one or more ingredients selected from glycerin, moisturizing agents, preservatives, bittering agents, ethanol, water or a neutral pH liquid, and fragrances.

7. The kit of claim 1, wherein the erasing solvent comprises:
  a) 40%-95% of methyl soyate; and
  b) 5%-60% of ethanol.

8. The kit of claim 7, wherein the solvent further comprises one or more ingredients selected from glycerin, moisturizing agents, preservatives, bittering agents, ethanol, and water or a neutral pH liquid, and fragrances.

9. A kit according to claim 1, further comprising a coating material which, when dried, provides a paintable surface.

10. A method for providing a footwear article suitable to change its outer appearance at a user's will, the method being safe for the user, comprising:
  (1) providing a flexible footwear article:
    providing a removable paint, suitable to adhere to said flexible footwear article, wherein said removable paint is water-insoluble and is at least as flexible as said flexible footwear article when coated and dried on said flexible footwear article;
    wherein said removable paint is a first paint composition comprising:
      a) 5%-38% of ethylene glycol;
      b) 0.05%-1% of carbendazim;

c) 0.08%-1% of chlorothalonil;
d) 35%-85% of acrylic resin;
e) 0.7%-2.5% of triethanolamine; and
f) 2%-45% of colorant;

or said removable paint is a second paint composition comprising:
a) 54%-95% of polyacrylic acid;
b) 1.5%-18% of propylene glycol benzene ether;
c) 0.1%-3% of disperser;
d) 0.05%-3% of preservative; and
e) 2%-22% of colorant;

or said removable paint is a third paint composition comprising:
a) 52%-96.5% of acrylic resin;
b) 2.5%-12% of glycol;
c) 0.5%-4% of triethanolamine;
d) 0.1%-2.5% of carbendazim;
e) 0.1%-2.7% of $C_4H_5NOS$;
f) 0.1%-3% of 2,2,4-trimethyl-1,3-pentanediol monoisobutyrate;
g) 0.05%-2% of an oil mixture; and
h) 2%-27% of colorant;
and
(2) providing an erasing solvent suitable to change the appearance of said footwear article by partially or essentially completely remove said paint from the footwear article after said paint is dry;

thereby obtaining footwear capable of changing its design by providing said removable paint, which is erasable with said solvent and sustainable in water, wherein said erasing solvent is non-toxic and safe for a child user coloring said footwear article with said removable paint.

11. A method according to claim 10, wherein the removable paint is suitable to be peeled-off the surface of the footwear article.

12. A method according to claim 10, further comprising repainting the footwear article from which the paint has been removed.

* * * * *